United States Patent
Huynh et al.

(10) Patent No.: US 10,479,484 B2
(45) Date of Patent: *Nov. 19, 2019

(54) METHODS AND APPARATUS FOR CONTROLLING AIRCRAFT FLIGHT CONTROL SURFACES

(71) Applicant: The Boeing Company, Chicago, IL (US)

(72) Inventors: Neal Van Huynh, Bellevue, WA (US); Patrick Joseph McCormick, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 157 days.

This patent is subject to a terminal disclaimer.

(21) Appl. No.: 15/695,749

(22) Filed: Sep. 5, 2017

(65) Prior Publication Data

US 2018/0362149 A1     Dec. 20, 2018

Related U.S. Application Data

(60) Provisional application No. 62/519,693, filed on Jun. 14, 2017.

(51) Int. Cl.
  *B64C 9/20*   (2006.01)
  *B64C 13/42*  (2006.01)
  *B64C 13/50*  (2006.01)

(52) U.S. Cl.
  CPC ............ *B64C 13/42* (2013.01); *B64C 13/503* (2013.01); *B64C 13/504* (2018.01)

(58) Field of Classification Search
  CPC ..... B64C 13/42; B64C 13/503; B64C 13/504; B64C 9/20; B64C 13/18; B64C 19/00; B05D 1/0077; G01M 17/00
  See application file for complete search history.

(56) References Cited

U.S. PATENT DOCUMENTS

| 4,472,780 A * | 9/1984 | Chenoweth .......... G05D 1/0077 |
| | | 244/194 |
| 7,984,878 B2 * | 7/2011 | Hirvonen ................ B64C 13/42 |
| | | 244/194 |

(Continued)

FOREIGN PATENT DOCUMENTS

EP            1964771         9/2008

OTHER PUBLICATIONS

Kale et al., Reconfigurable flight control strategies using model predictive control, 2002, IEEE, p. 43-48 (Year: 2002).*

(Continued)

*Primary Examiner* — McDieunel Marc
(74) *Attorney, Agent, or Firm* — Hanley, Flight & Zimmerman, LLC

(57) ABSTRACT

Methods and apparatus for controlling aircraft flight control surfaces are disclosed. An example apparatus includes a flight control surface controller to move a control surface of an aircraft to a target position via at least one of a first actuator or a second actuator associated with the control surface based on a command input received by the flight control surface controller. The flight control surface controller to: obtain a flight characteristic of the aircraft; compare the flight characteristic to a flight characteristic threshold; in response to a first comparison result, cause the first actuator to move the control surface to the target position based on the command input without moving the second actuator; and in response to a second comparison result, cause the first actuator and the second actuator to move the control surface to the target position based on the command input.

20 Claims, 7 Drawing Sheets

(56) References Cited

U.S. PATENT DOCUMENTS

| | | | | |
|---|---|---|---|---|
| 9,533,751 | B2* | 1/2017 | Lin | B64C 13/503 |
| 10,183,739 | B2* | 1/2019 | Hara | B64C 13/42 |
| 2004/0099763 | A1 | 5/2004 | Boehringer | |
| 2004/0195441 | A1 | 10/2004 | Wingett et al. | |
| 2013/0116863 | A1* | 5/2013 | Goupil | G01M 17/00 |
| | | | | 701/14 |
| 2013/0311006 | A1* | 11/2013 | Ahmad | B64C 19/00 |
| | | | | 701/3 |
| 2018/0334244 | A1* | 11/2018 | Cherepinsky | B64C 13/18 |
| 2018/0362147 | A1* | 12/2018 | Huynh | B64C 9/20 |

OTHER PUBLICATIONS

Gheorghe et al., Model-Based Approaches for Fast and Robust Fault Detection in an Aircraft Control Surface Servo Loop: From Theory to Flight Tests [Applications of Control], 2013, IEEE, p. 20-84 (Year: 2013).*

Collinson, Fly-by-wire flight control, 1999, IEEE, pg. 141-152 (Year: 1999).*

Wise, Affordable Flight Control for Aircraft and Missiles, 2000, IEEE, p. 259-290 (Year: 2000).*

European Patent Office, "Extended European Search Report," issued in connection with European Patent Application No. 18162352.1, dated Aug. 30, 2018, 8 pages.

Dominique Van Den Bossche, "The A380 Flight Control Electrohydrostatic Actuators, Achievements and Lessons Learnt," 25th International Congress of the Aeronautical Sciences, Sep. 3-8, 2006, Hamburg, Germany, 8 pages.

* cited by examiner

METHODS AND APPARATUS FOR CONTROLLING AIRCRAFT FLIGHT CONTROL SURFACES

RELATED APPLICATION

This patent application claims the benefit of U.S. Provisional Application Ser. No. 62/519,693, filed on Jun. 14, 2017. U.S. Provisional Application Ser. No. 62/519,693 is hereby incorporated herein by reference in its entirety.

FIELD

The present disclosure relates generally to aircraft and, more particularly, to methods and apparatus for controlling aircraft flight control surfaces.

BACKGROUND

Aircraft employ movable flight control surfaces to control the attitude of the aircraft. To move the flight control surfaces, aircraft employ systems such as, for example, fly-by-wire (FBW) flight control actuation systems. FBW flight control actuation systems replace conventional flight controls of an aircraft with an electronic interface. There are many advantages in FBW flight control actuation system that traditionally were powered by non-electric means. For example, traditional flight control actuation system employs high pressure hydraulic fluid to provide power to actuators that move airplane control surfaces. Conventional and traditional FBW flight control actuation system architecture include the hydraulic actuators powered by three independent hydraulic systems (3H) (for redundancy). On the other hand, the advantages of electric actuators include: elimination of bleeding the air bubbles from the hydraulic system; reducing aircraft weight and volume by replacing long hydraulic tubing from the engine pump to the electric actuators; and easier installation of the transport elements (e.g. electric power feeders). Integration of electric actuators also results in total airplane volume savings, which facilitates spatial integration of other system hardware and airplane design. Installation of wiring instead of hydraulic tubing also reduces airplane production costs. For these reasons, the aviation industry is moving toward 2H2E (2 independent hydraulic systems and 2 independent electrical systems) flight control power architectures that employs both traditional hydraulic and electric actuators. Drawbacks for electric actuator are lower reliability of hydraulic pump, electronics (e.g., for control the electrical motor control) that often needs to be operated in harsh environments, and/or regenerative effect of the electrical actuators on the airplane power system.

SUMMARY

An example apparatus disclosed herein includes a flight control surface controller to move a control surface of an aircraft to a target position via at least one of a first actuator or a second actuator associated with the control surface based on a command input received by the flight control surface controller. The flight control surface controller to: obtain a flight characteristic of the aircraft; compare the flight characteristic to a flight characteristic threshold; in response to a first comparison result, cause the first actuator to move the control surface to the target position based on the command input without moving the second actuator; and in response to a second comparison result, cause the first actuator and the second actuator to move the control surface to the target position based on the command input.

An example method disclosed herein includes receiving, by executing an instruction with at least one processor, a command input to move a control surface of an aircraft between an initial position and a target position via at least one of a first actuator or a second actuator associated with the control surface; obtaining, by executing an instruction with at least one processor, a flight characteristic of the aircraft; comparing, by executing an instruction with at least one processor, the flight characteristic to a flight characteristic threshold; in response to a first comparison result, commanding the first actuator to move the control surface to the target position based on the command input; and in response to a second comparison result, commanding the first actuator and the second actuator to move the control surface to the target position based on the command input.

An example tangible computer-readable medium disclosed herein includes instructions that, when executed, cause a machine to receive a command input to move a control surface of an aircraft to a target position via at least one of a first actuator or a second actuator associated with the control surface; obtain a flight characteristic of the aircraft; compare the flight characteristic to a flight characteristic threshold; in response to a first comparison result, command the first actuator to move the control surface to the target position based on the command input; and in response to a second comparison result, command the first actuator and the second actuator to move the control surface to the target position based on the command input.

DESCRIPTION

Figure 1:
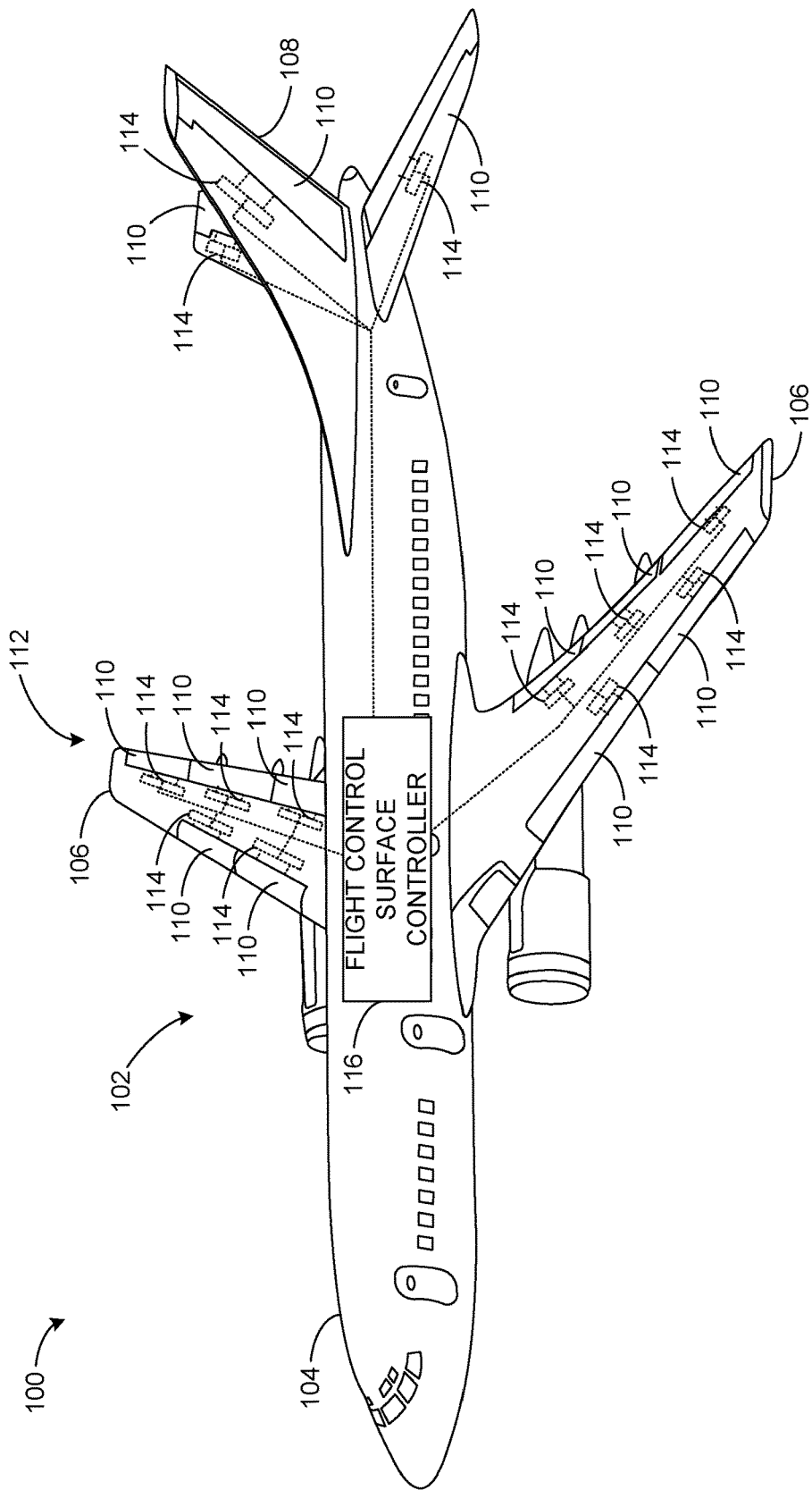
FIG. 1 illustrates an example aircraft implemented with an example actuation system in accordance with the teachings of this disclosure.

A flight control surface of aircraft is often actuated to a controlled position from a faired, trimmed position against relatively large aerodynamic loads. To move the flight control surface to the controlled position during flight and prevent the aerodynamic load from returning the flight control surface to an unwanted position when the flight control system commands the surface to the controlled position, an aircraft actuation system is employed. An actuation system for positioning flight control surfaces on large and/or fast aircraft require large force outputs to overcome aerodynamic loads (e.g., hinge moments) and accurate positioning with fast response time to achieve the desired flight path. To achieve such large force, fast response, and/or for safety reason, the actuation systems often employ two or more actuators to operate a control surface.

Actuators are commonly characterized by the forces they can produce and the response times (e.g., speeds) at which they can move. For most aircraft flight control surface actuation systems, there are specific load and rate (i.e., force and rate) combinations that must be satisfied: a maximum stall load (e.g., at zero rate) that must be resisted to hold the flight control surface in the commanded position and prevent it from blowing back toward an unwanted position; a maximum-power condition that combines a high surface rate with a hinge-moment load that is less than the maximum stall load; and a maximum no-load rate that measures how fast the actuator can move to the commanded position when a load is not applied to the actuator.

Some example actuator systems include first and second hydraulic actuators that operate in parallel or simultaneously to move a control surface of an aircraft. For safety, each of the actuators is configured to meet maximum stall load. For example, during a failure condition of one of the hydraulic actuators, the active (non-fail) hydraulic actuator requires to operate the flight control surface (e.g., meet peak aerodynamic loads of a flight mission). To configure such redundancy, each of the hydraulic actuators is sized and/or designed to satisfy peak aerodynamic loads and response rates to enable independent operation of the actuators during a failure event. In other words, as noted above, each of the actuators must be designed to meet the load and rate requirements for: maximum stall load (e.g., at zero rate); maximum-power condition; and a maximum no-load rate. For example, such hydraulic actuators are often sized for peak aerodynamic loads during take-off, landing and/or descending portions of a flight mission. As a result, components (e.g., pumps and distribution tubing) for conventional hydraulic systems are sized for peak load performance. However, during other portions of the flight mission or envelope (e.g., cruise), the aerodynamic loads are significantly less than the peak loads. Thus, designing each of the hydraulic actuators to meet maximum aerodynamic peak loads and response rates requires each of the hydraulic actuators, pumps and distribution tubing (e.g., hydraulic fluid lines) to be relatively larger than needed during non-peak aerodynamic load condition(s). As a result, each distributed hydraulic system of the single, dual, triple or quadruple hydraulic actuator(s) system requires considerably more power or energy (e.g., horsepower extraction from the aircraft engine) than is needed during non-peak aerodynamic loads, thereby reducing aircraft engine efficiency and reducing aircraft performance characteristic(s).

Another actuation system that may be used by aircraft is a hybrid power actuation system. An example hybrid power actuation system includes a hydraulic actuator and an electric actuator that each operates independently or both operate simultaneously and/or in parallel to control a flight control surface. Electric actuators that use electrical power for aircraft flight control-surface actuation result in reduced aircraft weight, efficient power consumption, improved system safety and maintainability. For example, an electrohydrostatic actuator (hereinafter EHA) is one type of several electric actuators that its usage eliminates at least one distributed hydraulic system, simplifies system architectures, and improves safety. An EHA actuation system advantageously only draws power when it is being commanded to actuate. This reduces power demand from an aircraft engine (due to eliminating the constant power draw of engine driven pumps). However, known hybrid power actuation systems are designed, and operated in active-standby system architecture (e.g. with a normal system the electric actuator is not commanded to actuated (standby), and in an abnormal system (failure occurred) the electric actuator is commanded to actuate when the adjacent hydraulic actuator cannot be actuated) that requires both the hydraulic actuator and the electric actuator to meet peak aerodynamic loads and response rates. This type of active-standby hybrid power actuation system results in a large power extraction from aircraft engines.

Example methods and apparatus disclosed herein employ hybrid power actuation systems that reduce electrical and/or hydraulic power consumption of a flight control system. The example hybrid power actuation systems disclosed herein enable aircraft configuration that requires more flight control surfaces and/or the surfaces be actuated at faster rates, reduce aircraft hydraulic power generation requirements, thereby reducing aircraft weight, hydraulic system envelope, and/or manufacturing costs. As a result, the example hybrid power actuation systems disclosed herein require less engine power compared to known actuation systems. By reducing horsepower extracted from an aircraft engine during a landing approach phase that often requires high rate/response of flight control surface actuations and with critical demands from other systems (e.g. environmental control system, wing anti-ice system, landing gears retraction, high lift actuation system, etc.), the example hybrid power actuation systems disclosed herein significantly reduce power extraction from aircraft engines by unique energy management techniques. Some examples disclosed herein include a design process and apparatus to optimize motive power of a flight control actuation system that includes at least one hydraulic system and an electrical system, thereby reducing the power needed in normal flight conditions, reducing the size of the hydraulic system(s), related heat rejection, transport components or elements, hydraulic actuator, as a result of the aforementioned efficiency gains.

To reduce aircraft weight, the example methods and apparatus employs only a first actuator (e.g., a hydraulic actuator) during a first portion of a flight mission and employ the first actuator and a second actuator (e.g., an EHA actuator) during a second portion of the flight mission different than the first portion. For example, example methods and apparatus disclosed herein employ (e.g., only) a first actuator to move the flight control surface when the aircraft is traveling within a first speed range and/or a first altitude range and employ the first actuator and a second actuator (e.g., an EHA actuator) to move the flight control surface when the aircraft is traveling within a second speed range and/or a second altitude range different than the first speed range and the first altitude range.

In some examples, example hybrid power actuation systems disclosed herein employ only a first actuator to move a flight control surface when aerodynamic conditions (e.g., aerodynamic loads) are such that the first actuator can position the flight control surface to a commanded position without assistance from the second actuator. However, example hybrid power actuation systems disclosed herein activate the second actuator to overcome aerodynamic conditions (e.g., aerodynamic loads) for which the first actuator requires assistance to move the control surface to a commanded position.

In some examples, the example hybrid power actuation systems disclosed herein activate (e.g., provide electric power) the second actuator when flight conditions are indicative of additional power requirements to move the control surface to a commanded position. In some examples, the example hybrid power actuation systems disclosed herein deactivate (e.g., remove electric power) to the second actuator when flight conditions are not indicative of additional power requirements to move the control surface to the commanded position. In this manner, electrical power may be applied to heat (e.g., warm up) the fluid of the second actuator to prepare the second actuator for use. Alternatively, electrical power can be removed from the second actuator to conserve energy when additional power requirements are not needed based on flight condition(s). Flight conditions may include, for example, aircraft speed, altitude, air temperature, airspeed, and/or any combination thereof, and/or any other flight condition(s) or parameter(s). For example, example hybrid power actuation systems disclosed herein may activate the second actuator when aircraft speed is within an aircraft speed threshold and altitude is within an altitude threshold.

In some examples, example hybrid power control actuation systems employ and/or activate the second actuator (e.g., irrespective flight mission status) when the first actuator is in a fail condition. Thus, the second actuator may operate the control surface to a commanded position when the first actuator is in a fail condition regardless of flight condition(s) (e.g., aircraft speed, altitude, aerodynamic loads, etc.).

FIG. 1 illustrates an example aircraft 100 implemented with an example flight control surface system 102 constructed in accordance with the teachings of this disclosure. The aircraft 100 of the illustrated example includes a fuselage 104 having wings 106 and an empennage 108. Each of the wings 106 and the empennage 108 include movable flight control surfaces 110 for controlling the aircraft 100 during flight. For example, the flight control surfaces 110 are movable relative to an exterior surface (e.g., an airfoil) of the aircraft 100 to affect air flow in accordance with the principles of aerodynamics to provide directional control of the aircraft 100 in flight. For example, the flight control surfaces 110 are actuated within a range of positions (e.g., between a first or retracted position and a second or extended position) to control roll, pitch and yaw of the aircraft 100. For example, to control attitudes of the aircraft 100, the flight control surfaces 110 include primary control surfaces such as, for example, ailerons to control roll, elevators to control pitch, and a rudder to control yaw. To control performance characteristic(s) of the aircraft 100, the flight control surfaces 110 may include secondary control surfaces such as, for example, leading edge slats and trailing edge flaps (e.g., inboard flaps and outboard flaps) to generate increased lift during takeoff and landing of the aircraft 100, spoilers to assist with air braking, etc.

To move the flight control surfaces 110, the flight control surface system 102 of the illustrated example includes an actuation system 112. The actuation system 112 of the illustrated example includes one or more actuator systems 114 controllable via a flight control surface controller 116. More specifically, respective ones of the actuator systems 114 control or move respective ones of the flight control surfaces 110. Thus, each of the flight control surfaces 110 of the illustrated example includes a dedicated actuator system 114. In operation, the flight control surface system 102 of the illustrated example moves the flight control surfaces 110 between a first position (e.g., a retracted position or faired position) and a second position (e.g., an extended position) to control a flight path of the aircraft 100 during flight.

In some examples, the flight control surface controller 116 of the illustrated example may be implemented by a flight control computer (e.g., an Integrated Flight Control Electronics (IFCE)). For example, the flight control surface controller 116 may operate the flight control surfaces 110 based on a command input received from the flight control computer. For example, the flight control computer may command the flight control surface controller 116 without command input from a pilot. For example, the flight control computer may command the flight control surface controller 116 of the illustrated example based on air data or flight condition information such as, for example, airspeed of the aircraft 100, velocity of air flowing along the aircraft 100 (e.g., an updraft, a downdraft, and/or a sidedraft), a temperature of the air surrounding the aircraft 100, an angle of attack of the aircraft 100, altitude, barometric data, ram air pressure and static pressure, air density, humidity, attitudes, accelerations, and/or other information associated with the air and/or other environmental or flight conditions. In some examples, the flight control surface controller 116 of the illustrated example may operate the flight control surfaces 110 based on command inputs received from a pilot and/or command input from the flight control computer.

Figure 2:
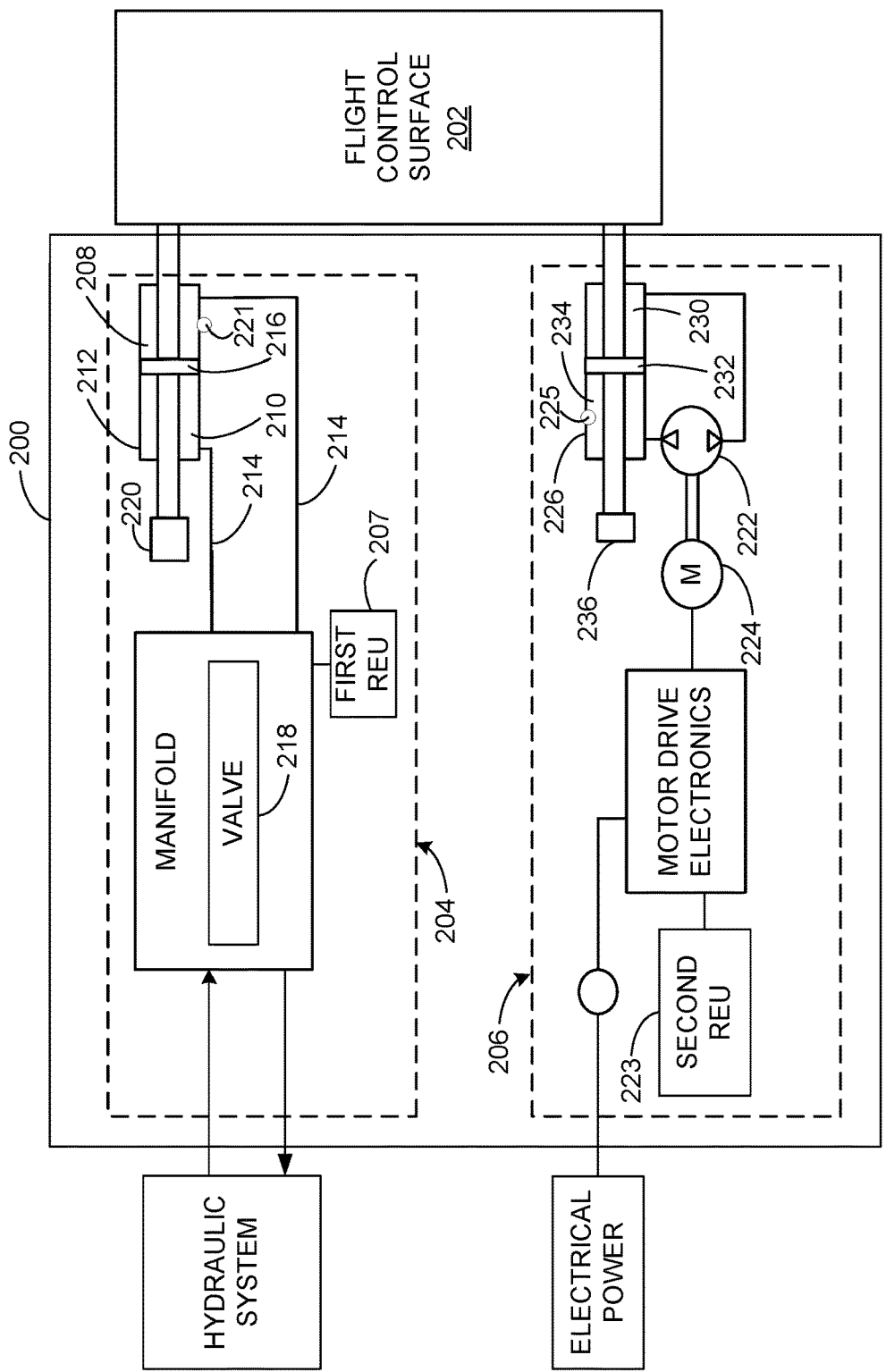
FIG. 2 is a schematic illustration of an example actuation system of the example aircraft of FIG. 1.

FIG. 2 is a schematic illustration of an example actuation system 200 (e.g., a hybrid actuation system) that may implement the actuator systems 114 of the aircraft 100 of FIG. 1. The actuation system 200 of the illustrated example operates a flight control surface 202. The flight control surface 202 of FIG. 2 is representative of one of the flight control surfaces 110 of the aircraft 100 of FIG. 1. Thus, each of the flight control surfaces 110 of FIG. 1 may be implemented with the actuation system 200 of FIG. 2. In some examples, some or only one of the flight control surfaces 110 of FIG. 1 may be implemented with the actuation system 200 of FIG. 2. For example, only the ailerons or the flaps may be implemented with the actuation system 200.

The actuation system 200 of the illustrated example includes a first actuator 204 and a second actuator 206 operatively coupled to the flight control surface 202. The first actuator 204 of the illustrated example is different than the second actuator 206. For example, the first actuator 204 of the illustrated example is a hydraulic actuator and the second actuator 206 of the illustrated example is an EHA. However, in some examples, the first actuator 204 and/or the second actuator 206 may be any actuator such as, for example, an actuator powered by an electric power source (e.g. an AC motor pump). Some further examples beyond the EHA include, but are not limited to, hydraulic actuators powered by "power packs," motor pumps (e.g., AC motor pumps), and/or any type of electrically motivated hydraulic pump including, but not limited to, electric backup hydraulic actuators (EBHAs), electromechanical actuators (EMAs), electromagnetic actuators and/or any other suitable actuator.

To control the first actuator and/or communicate characteristics of the first actuator 204 to other control system(s) (e.g., the flight control surface controller 116 of FIG. 1), the first actuator 204 of the illustrated example employs a remote electronic unit (REU) 207. For example, the REU 207 of the illustrated example is dedicated to the first actuator 204 and provides local actuator control signaled by, for example, high integrity data buses, thereby significantly reducing the amount of aircraft wire needed. For example, the REU 207 provides a closed-loop control system of the first actuator 204. During operation, the first actuator 204 of the illustrated example receives pressurized control fluid (e.g., hydraulic fluid) from a pressure source of the aircraft 100 such as an aircraft distributed hydraulic system or a primary hydraulic system of the aircraft 100 that may also control other hydraulically driven systems of the aircraft 100. In such a configuration, the control fluid is provided from a source remote from the first actuator 204 and the control fluid is pumped to a first chamber 208 and a second chamber 210 of a cylinder 212 of the first actuator 204 via tubing 214 (e.g., hydraulic fluid lines) to move a piston 216 within the cylinder 212 between a first position (e.g., to move the flight control surface 202 to a retracted or faired position) and a second position (e.g., to move the flight control surface 202 to an extended position). A hydraulic power generation device 218 directs the pressurized control fluid between the first chamber 208 of the cylinder 212 and the second chamber 210 of the cylinder 212. To detect or a measure a position of the piston 216, the first actuator 204 of the illustrated example may include a position sensor 220 (e.g., a linear variable differential transformer, etc.). To detect a force associated with (e.g., a force output of) the first actuator 204, the first actuator 204 of the illustrated example includes a force sensor 221. The force sensor 221 of the illustrated example may include, but is not limited to, a strain gage, a fiber optic gage, a piezo-electric pressure plate, and/or any other suitable force sensor. In some examples, the first actuator 204 may include a pressure sensor that detects a pressure value of the control fluid in an extended chamber (e.g., one of the first chamber 208 or the second chamber 210 of the cylinder 212) and/or a pressure value in a retracted chamber (e.g., the other one of the first chamber 208 or the second chamber 210 of the cylinder 212). In some such examples, the first actuator 204 and/or the REU 207 of the illustrated example determines or calculates a force in the extend chamber by multiplying the measured pressure value in the extended chamber by an area of extend piston and/or multiplying the measured pressure value in the retracted chamber by an area of the retracted piston. In some examples, the REU 207 of the illustrated example communicates to the flight control surface controller 116 of FIG. 1 the first actuator position data or signal(s) provided by, for example, the position sensor 220 and/or communicates force data or signal(s) provided by, for example, the force sensor 221 and/or calculated from the measured pressure value(s) in the cylinder 212.

The second actuator 206 of the illustrated example is an EHA actuator that is a self-contained hydraulic actuator. To control the second actuator 206 and/or communicate characteristics of the second actuator 206 to other control system(s) (e.g., the flight control surface controller 116 of FIG. 1), the second actuator 206 of the illustrated example employs a remote electronic unit (REU) 223. For example, the REU 223 of the illustrated example is dedicated to the second actuator 206 and provides local actuator control signaled by, for example, high integrity data buses, thereby significantly reducing the amount of aircraft wire needed. For example, the REU 223 provides a closed-loop control system of the second actuator 206. The second actuator 206 of the illustrated example includes a pump 222 (e.g., a hydraulic pump) driven by an electric motor 224 (e.g., a variable speed electric motor) and a cylinder 226, and a reservoir. The second actuator 206 of the illustrated example allows hydraulic actuation at relatively remote locations without the need to route hydraulic tubing or lines from the engine driven pump to the second actuator 206 because the second actuator 206 is electrically powered via the electric motor 224 and the hydraulic fluid is contained in the reservoir. Thus, the second actuator 206 does not require a distributed hydraulic power source as required by the first actuator 204.

In operation, the REU 223 commands the motor drive electronics which power is applied to the electric motor 224 to drive the pump 222 to deliver pressurized fluid (e.g., hydraulic fluid) between a first chamber 230 of the cylinder 226 to move a piston 232 in a first direction (e.g., to move the flight control surface 110 to the first position) and a second chamber 234 of the cylinder 226 to move the piston 232 in a second direction opposite the first direction (e.g., to move the flight control surface 110 to the second position). To detect a position of the piston 232, the second actuator 206 of the illustrated example includes a position sensor 236 (e.g., a linear variable differential transformer, etc.). To detect a force associated with (e.g., a force output of) the second actuator 206, the second actuator 206 of the illustrated example includes a force sensor 225. The force sensor 225 of the illustrated example may include, but is not limited to, a strain gage, a fiber optic gage, a piezo-electric pressure plate, and/or any other suitable force sensor(s). In some examples, the second actuator 206 may include a pressure sensor that detects a pressure value of the control fluid in an extended chamber (e.g., one of the first chamber 230 or the second chamber 234 of the cylinder 226) and/or a pressure value in a retracted chamber (e.g., the other one of the first chamber 230 or the second chamber 234 of the cylinder 226). In some such examples, the second actuator 206 and/or the REU 223 of the illustrated example determines or calculates a force in the extend chamber by multiplying the measured pressure value in the extended chamber by an area of extend chamber and/or multiplying the measured pressure value in the retracted chamber by an area of the retracted chamber. In some examples, the REU 223 of the illustrated example communicates to the flight control surface controller 116 of FIG. 1 the second actuator position data or signal(s) provided by, for example, the position sensor 236 and/or communicates force data or signal(s) provided by, for example, the force sensor 225 and/or calculated from the measured pressure value(s) detected in the cylinder 226.

In some examples, the first actuator 204 and/or the second actuator 206 may not include the REUs 207 and 223, respectively. In some such examples, the first actuator 204 and/or the second actuator 206 may be controlled and/or receive commands from any other control system such as, for example, the flight control surface controller 116, a flight control computer and/or any other controller(s).

To reduce weight and/or increase the efficiency of the aircraft 100, the first actuator 204 and the second actuator 206 of the illustrated example are configured (e.g., sized) to encounter different force requirements (e.g., different stall hinge moments or aerodynamic loads) and/or rate response times (e.g., actuator velocity requirements). For example, the first actuator 204 of the illustrated example is configured (e.g., sized) for non-peak load performance and the second actuator 206 of the illustrated example is configured (e.g., sized) for peak load performance and/or response rates (e.g., maximum response rates).

For example, the first actuator 204 may be configured to actuate the flight control surface 202 when non-peak aerodynamic loads (e.g., minimum stall hinge moments, minimum aircraft control requirements, etc.) are imparted to the flight control surface 202. Typically, such non-peak aerodynamic loads occur when the aircraft 100 is traveling in calm air conditions (e.g., low wind conditions) and/or in nominal or non-maneuvering conditions. For example, the second actuator 206 may be configured to actuate the flight control surface 202 when peak aerodynamic loads (e.g., maximum stall hinge moments, maximum aircraft control requirements, etc.) are imparted to the flight control surface 202. Typically, such peak aerodynamic loads may be imparted to the flight control surface 202 when the aircraft 100 is experiencing abnormal gusts, turbulent air, and/or aggressive maneuvers at a corner condition of the flight envelope, etc. Additionally, the second actuator 206 is configured to control the surface when the first actuator 204 is inoperative.

Thus, if the first actuator 204 is in a fail condition (e.g., when the first actuator 204 is in a non-operating state), the second actuator 206 can operate the flight control surface 202. In some examples, the first actuator 204 and the second actuator 206 may be configured in an active-active configuration (e.g., both actuators are active) to control similar loads (e.g., peak-loads) and/or provide similar response times.

In operation, the flight control surface controller 116 (FIG. 1) operates the first actuator 204 via the REU 207 to move the flight control surface 202 without assistance from the second actuator 206 when the aerodynamic loads do not exceed the rated aerodynamic load of the first actuator 204. The flight control surface controller 116 (FIG. 1) employs the second actuator 206 to provide additional power when needed (e.g., when the aerodynamic loads exceed the rated aerodynamic load of the first actuator 204 and/or a desired response rate exceeds a rated response rate of the first actuator 204). For example, the flight control surface controller 116 employs or operates the second actuator 206 via the REU 223 to move the flight control surface 202 to a commanded position based on a command input (e.g., from the pilot or the IFCE) when the aerodynamic loads imparted to the flight control surface 202 are greater than a rated load of the first actuator 204 and/or when response time of the first actuator 204 is lagging or outside a threshold response range. In some examples, the flight control surface system 102 of the illustrated example employs the first actuator 204 to move the flight control surface 202 while the aircraft 100 is moving at relatively low speeds and employs the second actuator 206 to move the flight control surface 202 when aerodynamic loads and/or response rates exceed the rated aerodynamic load and/or response rate of the first actuator 204.

In operation, to move the flight control surface 202, the flight control surface system 102 of the illustrated example uses only the first actuator 204 during a first set of conditions (e.g., flight conditions, aircraft speed, etc.) and uses both the first actuator 204 and the second actuator 206 during a second set of conditions (e.g., flight conditions, aircraft speed, etc.). Thus, the flight control surface system 102 of the illustrated example provides an on-demand actuation system that employs the second actuator 206 to assist the first actuator 204 when the flight conditions are such that the first actuator 204 may not be capable of moving the flight control surface 202 to a commanded position. In some examples, the second actuator 206 operates in parallel with the first actuator to move the flight control surface 202 to a commanded position. In some instances, the flight control surface system 102 of the illustrated example uses only the second actuator 206 to move the flight control surface 202 to a commanded position.

By configuring the first actuator 204 (e.g., the hydraulic actuator) to meet non-peak load performance, the first actuator 204 can be configured or sized smaller than a (e.g., hydraulic) actuator conventionally configured to meet peak load performance. As a result, a smaller sized actuator reduces weight of the aircraft 100 and demands less (e.g., hydraulic) power during operation, which improves aircraft performance and/or efficiency characteristic(s). In some examples, some configurations can result in a 45 percent (45%) reduction in flow rate of hydraulic fluid to the first actuator 204, which requires less horsepower extraction from an aircraft engine to pump the control fluid. Thus, the flight control surface system 102 of the illustrated example significantly reduces weight and improves aircraft performance and/or efficiency. For example, in some implementations on a typical large transport aircraft, the flight control surface system 102 of the illustrated example may reduce aircraft weight by approximately between 500 pounds (lbs.) and 1500 pounds (lbs.).

Figure 3:
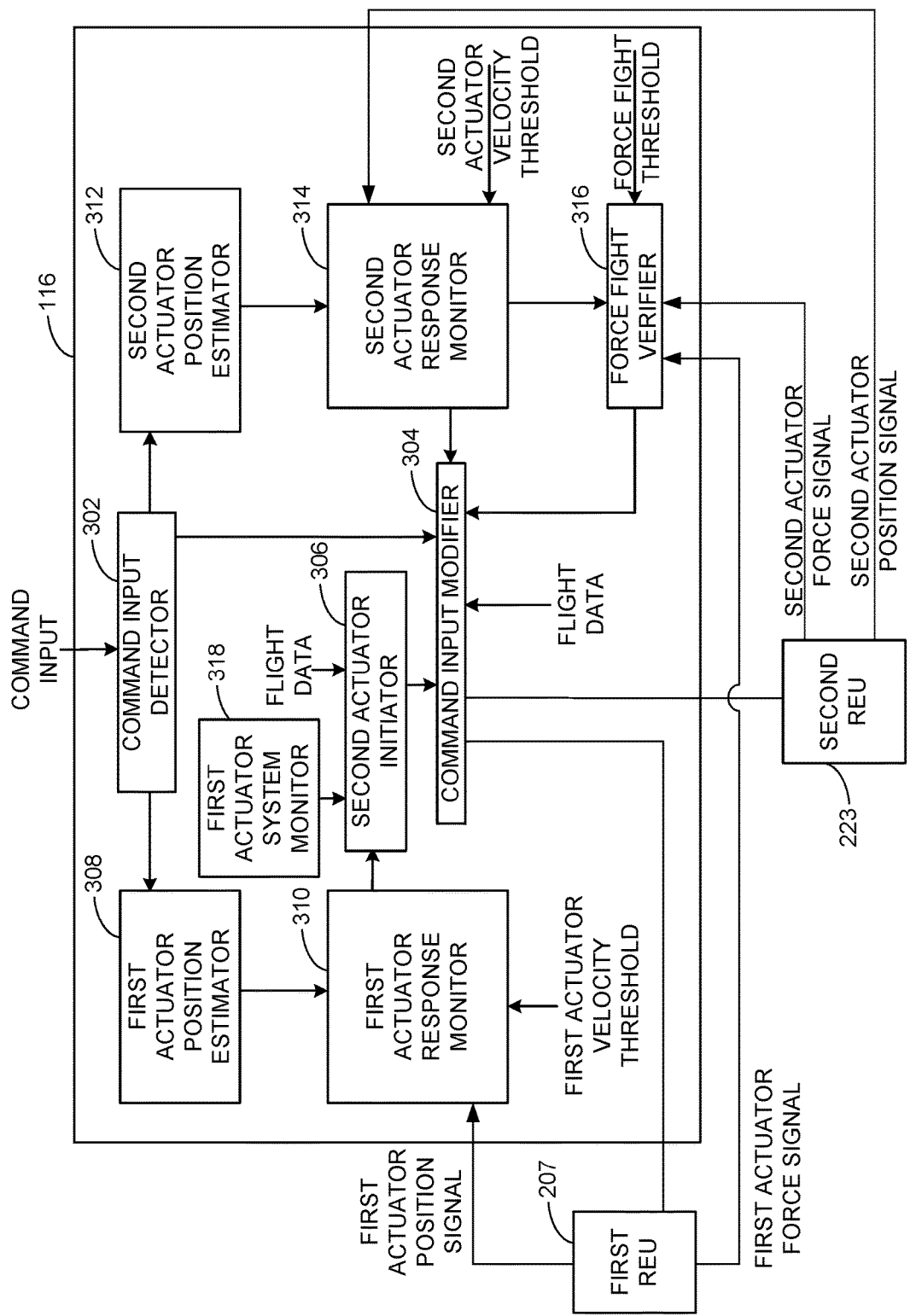
FIG. 3 is a block diagram of an example flight control surface controller of the example actuation system of FIGS. 1-2.

FIG. 3 is a block diagram of the flight control surface controller 116 of the actuation system of FIGS. 1-2. Referring to FIG. 3, the flight control surface controller 116 of the illustrated example includes an example command input detector 302, an example command input modifier 304, an example second actuator initiator 306, an example first actuator position estimator 308, an example first actuator response monitor 310, an example second actuator position estimator 312, an example second actuator response monitor 314, an example force fight verifier 316, and an example first actuator system monitor 318.

The command input detector 302 of the illustrated example receives and/or detects a command input to move the flight control surface 202 of the aircraft 100 to a target position (e.g., between a stowed or faired position and an extended position). As described in greater detail below, the flight control surface controller 116 moves the flight control surface 202 to the target position via at least one of the first actuator 204 or the second actuator 206. For example, the command input detector 302 detects a command input from the flight control computer (e.g., IFCE) and/or from a pilot control surface interface or module (e.g., control stick located in a cockpit of the aircraft 100). In some examples, the command input may be provided by the flight control computer or IFCE based on flight conditions such as, for example, air data, environmental characteristic(s) and/or operating condition(s). In the illustrated example, the command input detector 302 is communicatively coupled to the command input modifier 304, the first actuator position estimator 308 and the second actuator position estimator 312.

The second actuator initiator 306 of the illustrated example determines whether to activate or deactivate the second actuator 206 during flight. To determine whether to activate or deactivate the second actuator 206, the second actuator initiator 306 of the illustrated example receives and/or obtains flight condition data or flight characteristic(s) from, for example, the flight control computer, the IFCE, one or more sensors of the aircraft, etc. The flight condition data can include, for example, aircraft speed, altitude, air density, air temperature, air speed, etc. In particular, the example second actuator initiator 306 employs flight condition data and/or flight characteristic(s) to determine if flight conditions during one or more portions of a flight mission are indicative of additional power requirement needed to move the flight control surface 202 to a commanded position (e.g., a target position) based on the command input. For example, the second actuator initiator 306 of the illustrated example may employ the flight condition data to determine if the aircraft is at cruise, landing, taxiing, take-off, ascending and/or descending. For example, the second actuator initiator 306 of the illustrated example may activate the second actuator 206 during descent, landing and/or take-off and deactivate the second actuator 206 during cruise.

As used herein, activating the second actuator 206 means to provide power (e.g., electrical power) to the second actuator 206 (e.g., to pump the control fluid via the electric motor 224, to energize a heater to provide heat a control fluid (e.g., the hydraulic oil) of the second actuator 206, etc.) and deactivating the second actuator 206 means to remove power (e.g., electrical power) from the second actuator 206. Thus, in some examples when the second actuator 206 is in an active condition, electrical power may be provided to (e.g., a heater of) the second actuator 206 to heat (e.g., via the heater) the control fluid without commanding the piston 232 of the second actuator 206 to move. In this manner, for example, the second actuator 206 of the illustrated example consumes power (e.g., electrical power) during the activated condition and does not consume power during the deactivated condition, thereby conserving power and improving aircraft efficiency. Thus, the second actuator initiator 306 provides an on-demand second actuator 206 and conserves power when the second actuator 206 is not needed during one or more portions of a flight mission that do not require additional power to move and/or maintain the flight control surface 202 to the commanded position based on the command input.

To determine if the flight condition data and/or characteristic(s) are indicative of additional power requirement, the second actuator initiator 306 of the illustrated example compares the flight condition data and/or characteristic(s) to a flight characteristic threshold. For example, the flight condition data and/or characteristic(s) may include airspeed, aircraft altitude, air temperature and the flight condition data and/or characteristic(s) may need to satisfy one or more flight characteristic thresholds (e.g., an aircraft speed threshold, an altitude threshold, an air temperature threshold, etc.) to activate the second actuator 206.

Thus, during the portions of flight in which additional power or assistance from the second actuator 206 is not needed to move and/or maintain the flight control surface 202 to a target position based on the command input via the second actuator 206, the second actuator initiator 306 may deactivate the second actuator 206. For example, in response to a flight condition data and/or characteristic(s) being less than the flight characteristic threshold, the second actuator initiator 306 may deactivate the second actuator 206 and/or the command input modifier 304 may operate the first actuator 204 to move the flight control surface 202 to the target position based on the command input (e.g., without use of the second actuator 206).

During portions of flight in which the flight conditions are indicative of additional power requirement needed to move the flight control surface 202 to the target position based on the command input, the second actuator initiator 306 activates the second actuator 206. For example, in response to a flight condition data and/or characteristic(s) being less than the flight characteristic threshold, the second actuator initiator 306 may activate the second actuator 206 and/or the command input modifier 304 to operate the first actuator 204 and the second actuator 206 to move the flight control surface 202 to the target position based on the command input.

Additionally, the second actuator initiator 306 of the illustrated example receives a status of the first actuator 204 (e.g., the first actuator system, components, pressure, etc.) via the first actuator system monitor 318. The first actuator system monitor 318 determines an operational condition of the first actuator 204 and provides information to the second actuator initiator 306. For example, the first actuator system monitor 318 determines if the first actuator 204 is in a non-failure condition or a fail condition. For example, the first actuator system and/or the first actuator 204 may be in a fail condition if its hydraulic seals are damaged and leaking control fluid (e.g., hydraulic fluid), the fluid of the first actuator 204 is leaking and/or abnormal cylinder pressure due to seal failure, the position sensor is malfunctioning, and/or any other condition that prevents and/or inhibits normal operation of the first actuator 204. When the first actuator 204 is in a fail condition, the second actuator initiator 306 activates the second actuator 206. In some examples, when the first actuator system monitor 318 determines that the first actuator 204 is in a fail condition, the command input modifier 304 commands the second actuator 206 and may attempt to command the first actuator 204 based on the command input and/or a command input modified by the command input modifier 304. In some examples, when the first actuator system monitor 318 determines that the first actuator 204 is in a fail condition, the command input modifier 304 commands the second actuator 206 based on the command input and/or a command input modified by the command input modifier 304 without use of the first actuator 204.

The command input modifier 304 of the illustrated example receives the command input from the command input detector 302, activation/deactivation command from the second actuator initiator 306, a first actuator response status from the first actuator response monitor 310 and/or a second actuator response status from the second actuator response monitor 314. Based on the received command and/or information from the command input detector 302, the second actuator initiator 306, the first actuator response monitor 310 and/or the second actuator response monitor 314, the command input modifier 304 of the illustrated example provides a first actuator control signal to the first actuator 204 and/or a second actuator control signal to the second actuator 206.

In some examples, the command input modifier 304 operates the first actuator 204 and/or the second actuator 206 based on the command input without modifying the command input received by the command input detector 302. In some examples, the command input modifier 304 of the illustrated example may adjust or override the command input to optimize the aircraft efficiency based on flight conditions and/or other flight parameters. For example, the command input modifier 304 may modify a command input received from the command input detector 302 based on aircraft speed, air speed, air density, air temperature, altitude, air speed, rain, ice accumulation, etc. In some examples, the command input modifier 304 modifies the command input (e.g., without a pilot's input) to help stabilize the aircraft 100 and/or prevent operation of the aircraft 100 outside of a performance envelope of the aircraft 100.

The first actuator position estimator 308 of the illustrated example receives the command input from the command input detector 302. The first actuator position estimator 308 of the illustrated example simulates or generates a model (e.g., a simulated model) of estimated position versus time of the first actuator 204 representative of the first actuator moving from an initial position to a target position based on at least the command input. In other words, the first actuator position estimator 308 simulates positional information of the piston 216 of the first actuator 204 as a function of time representative of the piston 216 moving between an initial position and a target position (e.g., the commanded positioned based on the command input). The position versus time values may be based on a sampling period (e.g., every 50 milliseconds). In some examples, the first actuator position estimator 308 simulates a model of the first actuator 204 based on the command input using a second order transfer function model to provide position verses time values. In some examples, the transfer function model is generated in real-time (e.g., during flight or after the command input is received) based on the command input. In some examples, the model is provided as a predetermined look-up table based on, for example, response time characteristic(s) of the first actuator 204 and the command input. In some such examples, the first actuator position estimator 308 retrieves position versus time values from the predetermined look-up table stored in memory corresponding to the command input.

Additionally, the first actuator position estimator 308 measures or determines (e.g., calculates) a first estimated velocity of the piston 216 based on the estimated position versus time model. For example, the first actuator position estimator 308 can determine the first estimated velocity by calculating a time derivative of the estimated positions. In some example, the first actuator position estimator 308 determines an estimated time derivative between an estimated initial position and a second estimated position obtained from the model. In some examples, the first actuator position estimator 308 obtains the first estimated velocity from a predetermined look-up table generated based on the response time characteristic(s) of the first actuator 204.

The first actuator response monitor 310 measures or determines positions of the piston 216 of the first actuator 204 based on signal values provided by the position sensor 220 of the first actuator 204 as the piston 216 moves the flight control surface 202 between the initial position and the target position. For example, the first actuator response monitor 310 measures positions of the piston 216 of the first actuator 204 based on a sampling period (e.g., between approximately 1 millisecond and 100 milliseconds). Thus, the first actuator response monitor 310 associates a time stamp to each measured position value.

Additionally, the first actuator response monitor 310 determines or measures a velocity of the piston 216 of the first actuator 204 as the piston 216 moves between an initial position and the commanded position. In some examples, the first actuator response monitor 310 of the illustrated example calculates a time derivative of the position values obtained during the sampling period. For example, the first actuator response monitor 310 determines a measured time derivative between a measured initial position of the piston 216 and a second measured position of the piston 216. In some examples, the first actuator response monitor 310 receives a signal representative of the velocity of the piston 216 from a speed sensor operatively coupled to the piston 216 and/or the first actuator 204.

The first actuator response monitor 310 of the illustrated example monitors a response accuracy of the first actuator 204 based on the position and/or velocity values. For example, the first actuator response monitor 310 of the illustrated example compares (e.g., via a comparator) the measured position versus time values measured by the first actuator response monitor 310 and the estimated positions versus time values provided by the first actuator position estimator 308. In some examples, the first actuator response monitor 310 determines and/or compares a difference between the first measured position and the first estimated position to a first position threshold. In some examples, the first actuator response monitor 310 determines and/or compares a difference between first determined velocity value and the first estimated velocity a first actuator velocity threshold. For example, if the difference between the first measured position and the first estimated position is within the first position threshold (e.g., if the first measured position is between approximately 2% to 10% of the first estimated position) and/or the difference between the first determined velocity and the first estimated velocity is within the first velocity threshold (e.g., if the first determined velocity is between approximately 2% to 10% of the first estimated velocity), the first actuator response monitor 310 of the illustrated example determines that the response accuracy of the first actuator 204 is within an acceptable operating range.

The second actuator position estimator 312 of the illustrated example receives the command input from the command input detector 302. The second actuator position estimator 312 of the illustrated example simulates a position versus time model of the second actuator 206 based on the command input. In other words, the second actuator position estimator 312 simulates positional information of the piston 232 of the second actuator 206 as a function of time as the piston 232 moves between an initial position and a target position (e.g., the commanded positioned based on the command input). The position versus time values may be based on a sampling period. In some examples, the second actuator position estimator 312 simulates a model of the second actuator 206 based on the command input using a second order transfer function model to provide position verses time values. In some examples, the transfer function model is generated in real-time (e.g., during flight or after the command input is received) based on the command input. In some examples, the model is provided as a predetermined look-up table based on, for example, response time characteristic(s) of the second actuator 206 and the command input and the second actuator position estimator 312 retrieves position versus time values from the predetermined look-up table stored in memory corresponding to the command input.

Additionally, the second actuator position estimator 312 measures or determines (e.g., calculates) a first estimated velocity of the piston 232 based on the estimated position versus time model. For example, the second actuator position estimator 312 can determine the second estimated velocity by calculating a time derivative of the estimated positions. In some examples, the second actuator position estimator 312 obtains the first estimated velocity from a predetermined look-up table generated based on the response time characteristic(s) of the second actuator 206.

The second actuator response monitor 314 measures positions of the piston 232 of the second actuator 206 based on signal values provided by the position sensor 236 of the second actuator 206 as the piston 232 moves the flight control surface 202. For example, the second actuator response monitor 314 measures positions of the piston 232 of the second actuator 206 based on a sampling period. Thus, the second actuator response monitor 314 associates a time stamp with each measured position value.

Additionally, the second actuator response monitor 314 determines a velocity of the piston 232 of the second actuator 206 as the piston 232 moves between an initial position and the commanded position. In some examples, the second actuator response monitor 314 of the illustrated example calculates a time derivative of the position values obtained during the sampling period. In some examples, the second actuator response monitor 314 receives a signal representative of the velocity of the piston 232 from a speed sensor operatively coupled to the piston 232 and/or the second actuator 206.

The second actuator response monitor 314 of the illustrated example monitors a response accuracy of the second actuator 206 based on the position and/or velocity values. For example, the second actuator response monitor 314 of the illustrated example compares (e.g., via a comparator) the measured position versus time values measured by the second actuator response monitor 314 and the estimated positions versus time values provided by the second actuator position estimator 312. In some examples, the second actuator response monitor 314 determines and/or compares a difference between the second measured position and the second estimated position to a second position threshold. In some examples, the second actuator response monitor 314 determines and/or compares a difference between second determined velocity value and the second estimated velocity a first actuator velocity threshold. For example, if the difference between the second measured position and the second estimated position is within the second position threshold and/or the difference between the second determined velocity and the second estimated velocity is within the second velocity threshold, the second actuator response monitor 314 of the illustrated example determines that the response accuracy of the second actuator 206 is within an acceptable operating range.

The force fight verifier 316 of the illustrated example is communicatively coupled with the first REU 207 and the second REU 223. The force fight verifier 316 of the illustrated example receives a first actuator force signal from, for example, the force sensor 221 of the first actuator 204 (e.g., via the REU 207), and the receives a second actuator force signal from, for example, the force sensor 225 of the second actuator 206 (e.g., via the REU 223). In some examples, when both the first actuator 204 and the second actuator 206 are activated to move the flight control surface 202 based on the command input, the command input modifier 304 may modify the command input based on detected or measured force fight information provided by the force fight verifier 316. The force fight verifier 316 of the illustrated example determines if fight force on the first actuator 204 (e.g., based on the first actuator force signal) and/or the second actuator 206 (e.g., based on the second actuator force signal) exceed a force fight threshold. In some instances, for example, the first actuator 204 and the second actuator 206 may not always be positioned to share an intended load (e.g., an aerodynamic load, a hinge load, etc.). In some such instances, a difference in actuator positioning may create a reactive force condition(s) or fight force, which may be imparted to the one of the first actuator 204 or the second actuator 206. When the first actuator 204 and the second actuator 206 are commanded by the command input modifier 304, the force fight verifier 316 receives measured force values imparted to the first actuator 204 and/or the second actuator 206 (e.g., from the first and second force sensors 221 and 225, respectively) and determines if the measured force fight is within a force fight threshold (e.g., within between 5% and 20% of the force fight threshold). In some instances, for example, the first actuator 204 may respond quicker to the command input than the second actuator 206, which can create force fight. In some such examples, if force fight created is greater than the force fight threshold, the command input modifier 304 may vary the command input to the first actuator 204 and/or the second actuator 206. For example, the command input modifier 304 may provide a command to move the piston 216 of the first actuator 204 in a first direction (e.g., move the piston 216 away from the flight control surface 202, lessen a load on the first actuator 204, etc.) and/or may provide a command to move the piston 232 of the second actuator 206 in a second direction (e.g., move the piston 232 toward the flight control surface 202, increase a load on the second actuator 206, etc.).

While an example manner of implementing the flight control surface controller 116 of FIG. 1 is illustrated in FIG. 3, one or more of the elements, processes and/or devices illustrated in FIG. 3 may be combined, divided, re-arranged, omitted, eliminated and/or implemented in any other way. Further, the example command input detector 302, the example command input modifier 304, the example second actuator initiator 306, the example first actuator position estimator 308, the example first actuator response monitor 310, the example second actuator position estimator 312, the example second actuator response monitor 314, the example fight force verifier 316, the example first actuator system monitor 318, more generally, the flight control surface controller 116 of FIG. 3 may be implemented by hardware, software, firmware and/or any combination of hardware, software and/or firmware. Thus, for example, any of the example command input detector 302, the example command input modifier 304, the example second actuator initiator 306, the example first actuator position estimator 308, the example first actuator response monitor 310, the example second actuator position estimator 312, the example second actuator response monitor 314, the example fight force verifier 316, the example first actuator system monitor 318, more generally, the flight control surface controller 116 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example command input detector 302, the example command input modifier 304, the example second actuator initiator 306, the example first actuator position estimator 308, the example first actuator response monitor 310, the example second actuator position estimator 312, the example second actuator response monitor 314, the example fight force verifier 316, the example first actuator system monitor 318, more generally, the flight control surface controller 116 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the flight control surface controller 116 of FIG. 3 may include one or more elements, processes and/or devices in addition to, or instead of, those illustrated in FIG. 3, and/or may include more than one of any or all of the illustrated elements, processes and devices.

Figure 4:
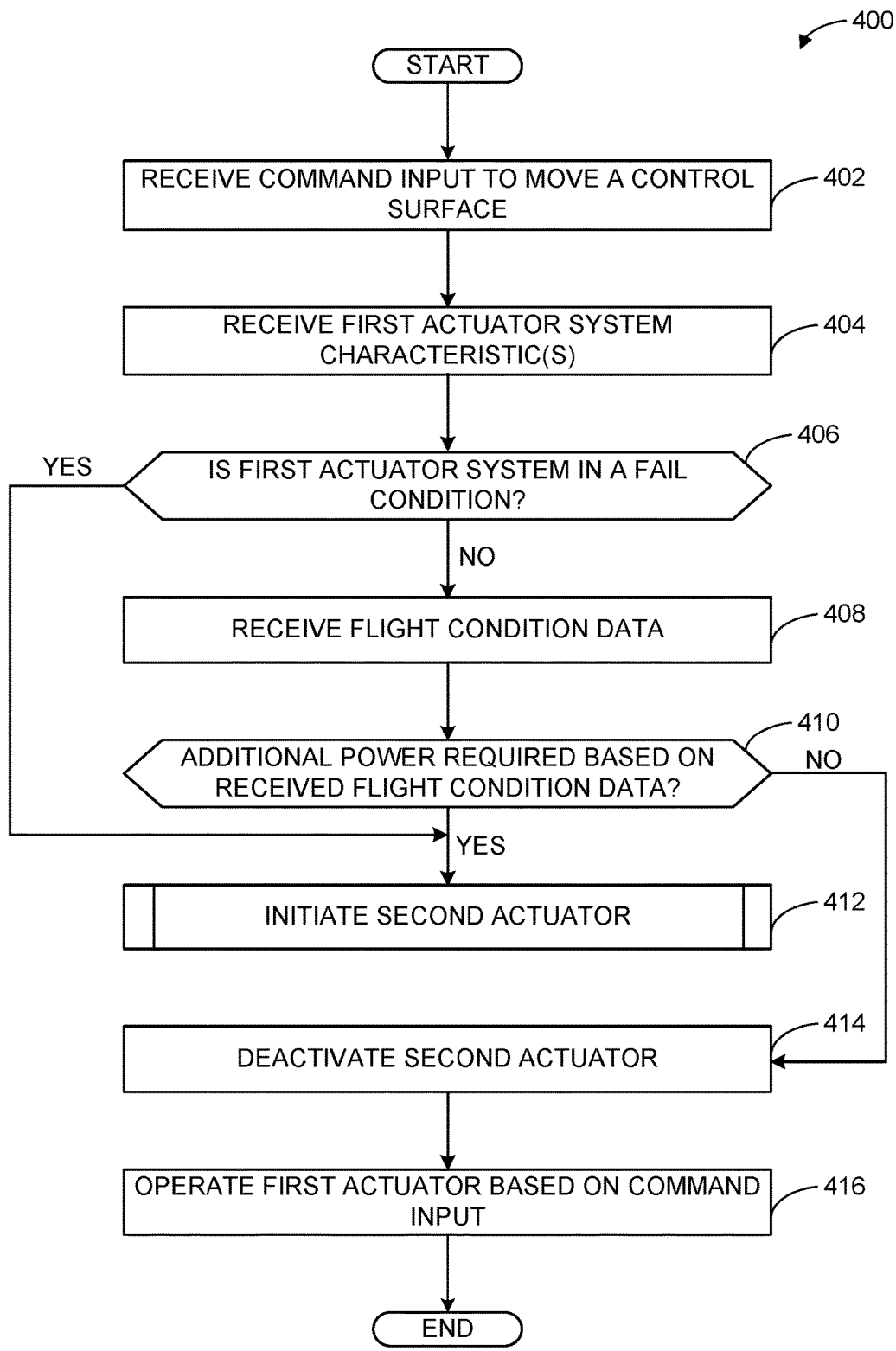
FIGS. 4, 5A and 5B are flowcharts representative of example methods that may be used to implement the example flight control surface controller of the example actuation system of FIGS. 1-3.
Figure 5A:
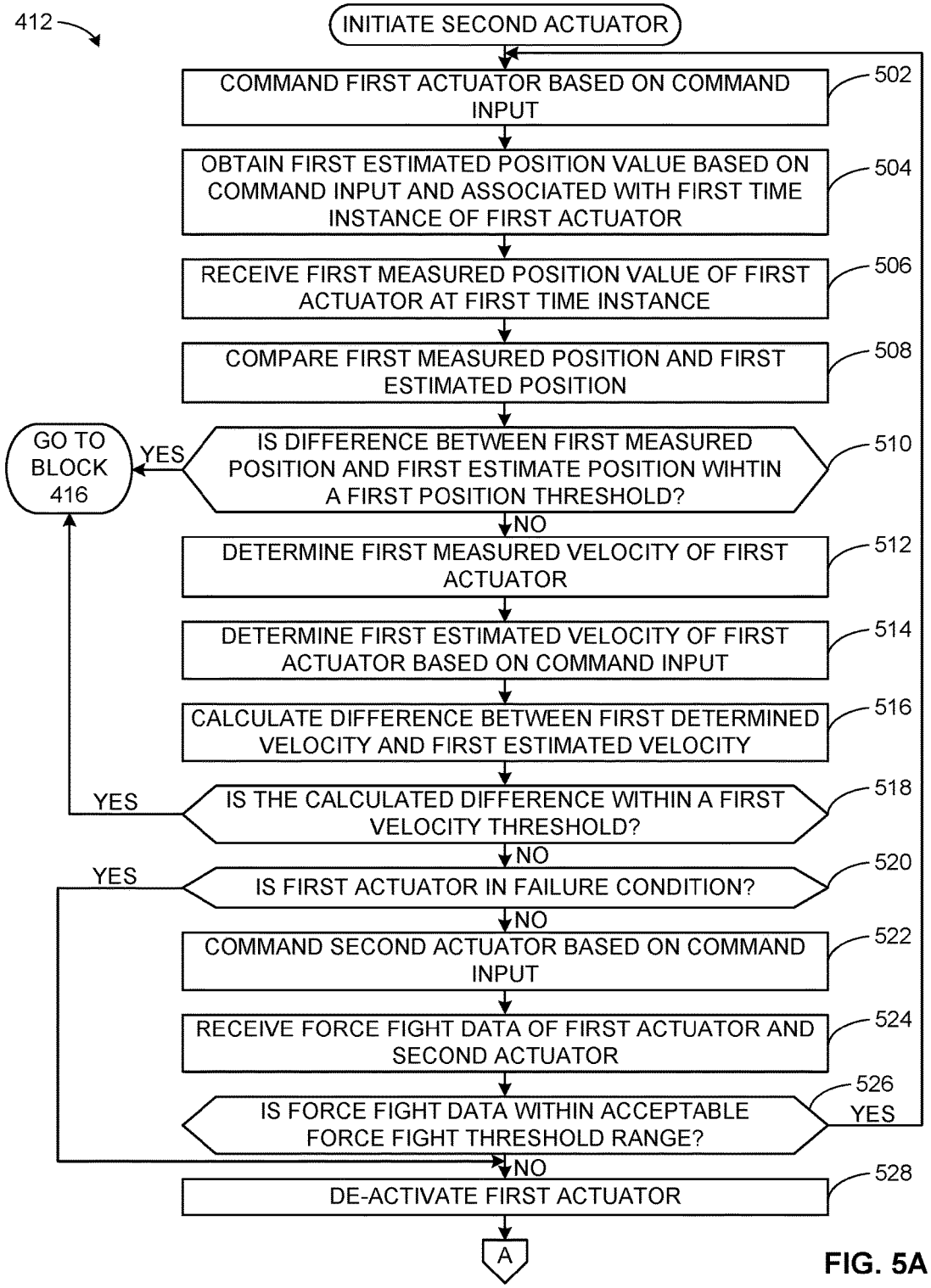
Figure 5B:
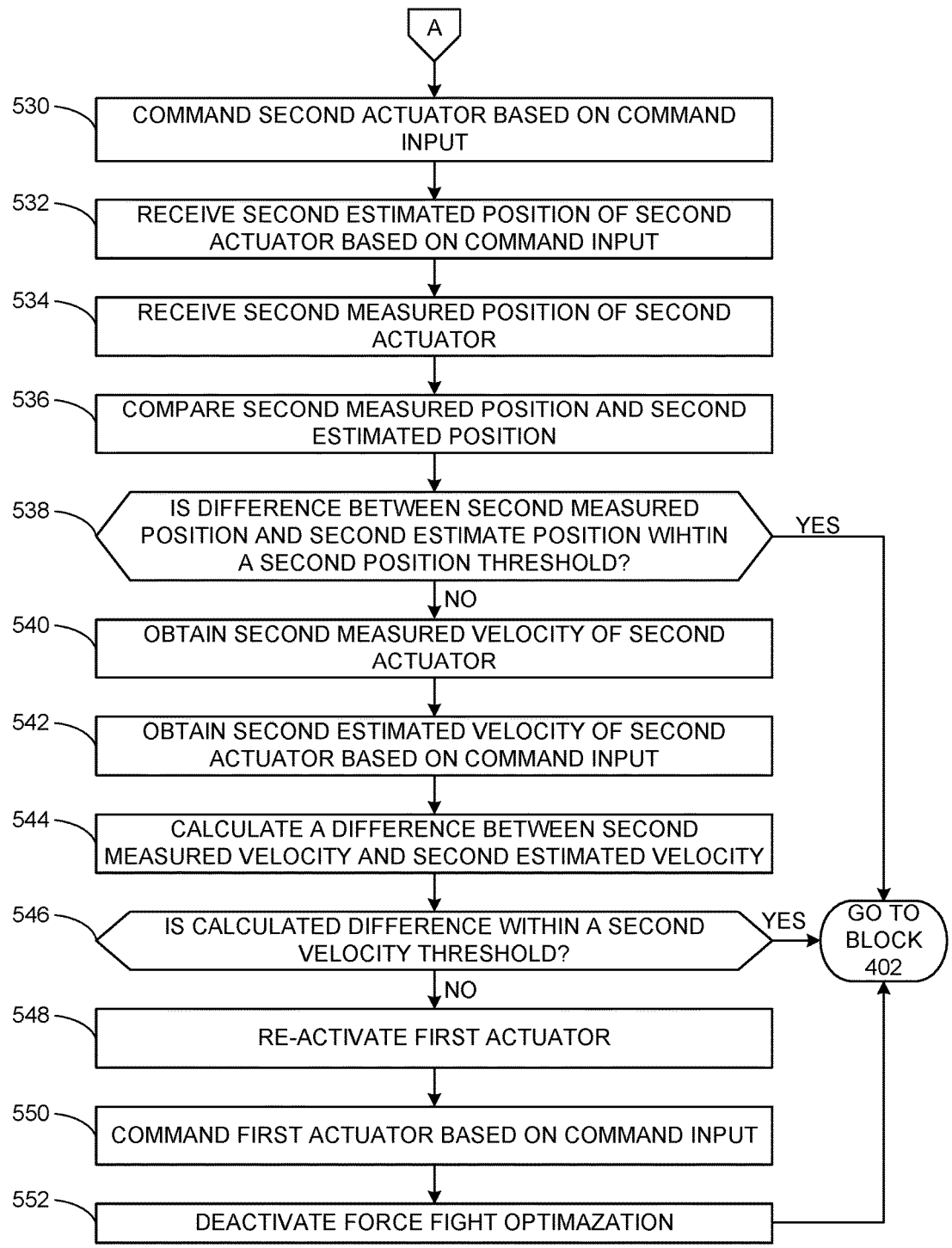

A flowchart representative of example methods for implementing the flight control surface controller 116 of FIG. 3 is shown in FIGS. 4, 5A and 5B. In this example, the methods may be implemented using machine readable instructions comprise a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIGS. 4, 5A and 5B, many other methods of implementing the flight control surface controller 116 may alternatively be used. For example, the order of execution of the blocks may be changed, and/or some of the blocks described may be changed, eliminated, or combined. Additionally, or alternatively, any or all the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4, 5A and 5B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The method 400 of FIG. 4 begins at block 402 when the command input detector 302 receives a command input to move the flight control surface 202. For example, the command input detector 302 of the illustrated example communicates the command input to the command input modifier 304. The first actuator system monitor 318 receives first actuator characteristic(s) (block 404) and determines if the first actuator 204 is in a fail condition based on the received characteristic(s) (block 406). For example, some example characteristic(s) received by the first actuator system monitor 318 may include pressure values inside the cylinder 212 of the first actuator 204, pressure values within the tubing 214, operational status of the hydraulic power generation device 218, operational status of the position sensor 220 and/or any other characteristic(s) associated with the first actuator 204 indicative of an operational status of the first actuator 204.

If the first actuator 204 is not in a fail condition at block 406, the second actuator initiator 306 receives flight condition data (block 408) to determine if additional power is required to move the flight control surface 202 to a target position based on the command input (block 410). If the second actuator initiator 306 determines that additional power is not needed at block 410, the second actuator initiator 306 deactivates the second actuator 206 (block 414). The command input modifier 304 of the illustrated example operates the first actuator 204 based on the command input (block 416). In some examples, the second actuator initiator 306 does not deactivate the second actuator 206 and operates the first actuator based on the command input (block 416).

If the first actuator system is in a fail condition at block 406 and/or the second actuator initiator 306 determines that additional power is required based on flight condition data at block 410, the second actuator initiator 306 activates the second actuator 206 for operation (block 412). More specifically, the second actuator initiator 306 activates the second actuator 206 by providing power (e.g., electrical power) to the second actuator 206. In some examples, the electrical power provided to the second actuator 206 heats the control fluid of the second actuator 206 in preparation for use. In some examples, the control fluid of the second actuator 206 may be above a threshold temperature and the second actuator 206 may be in a stand-by mode ready to receive a second actuator control signal from the command input modifier 304.

FIGS. 5A and 5B depict an example method 412 of the example process of the example flowchart of FIG. 4 to initiate the second actuator 206 of the example actuator system of FIGS. 1-3. The method 412 of FIGS. 5A and 5B begins when the command input modifier 304 sends a first actuator control signal to the first actuator 204 to actuate the first actuator 204 based on the command input (block 502).

The first actuator position estimator 308 of the illustrated example obtains a first estimated position value of the first actuator 204 based on the command input (block 504). For example, the first actuator position estimator 308 receives the command input from the command input detector 302 and simulates a model of estimated position versus time values of the first actuator 204 based on the command input. Thus, the estimated position value obtained by the first actuator position estimator 308 includes a corresponding time value (e.g., based on the sampling period of the first actuator response monitor 310).

The first actuator response monitor 310 receives a first measured position value of the first actuator 204 (block 506). For example, the first actuator response monitor 310 of the illustrated example receives the first measured position value from the position sensor 220 as the piston 216 moves between an initial position toward a first position. The first position, for example, being between the initial position and a final position of the piston 216 required to move the control surface 202 to a target position. For example, the first actuator response monitor 310 receives position values from the position sensor 220 based on a sampling period. The first actuator response monitor 310 of the illustrated example provides a time stamp associated with each measured position value.

The first actuator response monitor 310 obtains (e.g., receives or retrieves) the first estimated position value associated with the time stamp value of the first measured position from the first actuator position estimator 308. The first actuator response monitor 310 compares the first measured position value and the first estimated position value (block 508). In particular, the first actuator response monitor 310 determines if a difference between the first measured position and the estimated position within a first position threshold (block 510). If the difference is within the first position threshold at block 510, the method 412 returns to block 416 of FIG. 4 and the command input modifier 304 operates the first actuator 204 to move the flight control surface 202 based on the command input without use of the second actuator 206.

If the difference between the first measured position and the first estimated position is not within the threshold at block 510, the first actuator response monitor 310 determines a first measured velocity of the first actuator 204 (block 512) and a first estimated velocity of the first actuator (block 514). For example, the first actuator response monitor 310 may determine the first measured velocity by calculating time derivatives of the measured position values received from the position sensor 220 (e.g., a time derivative of the piston 216 moving between the initial position and the first position). Additionally, the first actuator response monitor 310 may determine the first estimated velocity by calculating a time derivative of the estimated positional values of the model provided by the first actuator position estimator 308 (e.g., based on estimated time values based on a response rate of the first actuator 204).

The first actuator response monitor 310 calculates or determines a difference between the first measured velocity and the first estimated velocity (block 516). The first actuator response monitor 310 calculates or determines if the difference is within a first velocity threshold (block 518). If the calculated difference is within the first velocity threshold at block 518, the method 412 returns to block 416 of FIG. 4 and the command input modifier 304 operates the first actuator 204 based on the command input. Additionally, the command input modifier 304 operates the first actuator 204 to move the flight control surface 202 without use of the second actuator 206.

If the first actuator response monitor 310 determines that the difference is not within the first velocity threshold at block 518, the first actuator system monitor 318 and/or the second actuator initiator 306 determines or identifies if the first actuator 204 is a failure condition based on the first actuator system characteristic(s) (block 520). If the first actuator 204 is not in a failure condition at block 520, the command input modifier 304 commands the second actuator based on the command input (block 522).

After the command input modifier 304 commands the first actuator 204 and the second actuator 206 based on the command input, the force fight verifier 316 receives force fight data associated with the first actuator 204 and the second actuator 206 (block 524). The force fight verifier 316 determines if the force fight data is within a force fight threshold range (block 526). For example, the force fight verifier 316 determines if the force fight data is outside a force fight, pre-determined threshold range. If the force fight verifier 316 determines that the force fight data is within the force fight threshold range at block 526, the method 412 returns to block 502. In some examples, the force fight verifier 316 adjusts the positions of at least one of the first actuator 204 or the second actuator 206 via the command input modifier 304 if the force fight data is within the pre-determined threshold range and the adjustments to the at least one of the first actuator 204 or the second actuator 206 provides improved (e.g., optimized) flight performance characteristic(s).

If the first actuator system monitor 318 and/or the second actuator initiator 306 detect a fail condition at block 520 and/or if the force fight verifier 316 determines that the force fight data is not within the force fight threshold range at block 526, the command input modifier 304 deactivates the first actuator 204 (block 528). For example, the command input modifier 304 commands the first actuator 204 to move to a retracted position, an extended position or leaves the first actuator 204 at a position when the first actuator 204 is deactivated.

With the first actuator 204 deactivated, the command input modifier 304 commands the second actuator 206 based on the command input (block 530). The second actuator position estimator 312 of the illustrated example obtains (e.g., generates or retrieves) a second estimated position value of the second actuator 206 based on the command input (block 532). For example, the second actuator position estimator 312 receives the command input from the command input detector 302 and simulates a model (e.g., a simulated model) of estimated position versus time values of the second actuator 206 based on the command input. Thus, the estimated position value obtained by the second actuator position estimator 312 includes a corresponding time value (e.g., based on the sampling period of the second actuator response monitor 314).

The second actuator response monitor 314 receives a second measured position value of the second actuator 206 (block 534). For example, the second actuator response monitor 314 of the illustrated example receives the second measured position value from the position sensor 236 as the piston 232 moves between an initial position and a first position. The first position, for example, being between the initial position and a final position of the piston 232 required to move the control surface 202 toward a target position. For example, the second actuator response monitor 314 receives position values from the position sensor 236 based on a sampling period. The second actuator response monitor 314 of the illustrated example provides a time stamp associated with each measured position value and obtains (e.g., receives or retrieves) the second estimated position value associated with the time stamp value of the second measured position from the second actuator position estimator 312.

The second actuator response monitor 314 compares the second measured position value and the second estimated position value (block 536). In particular, the second actuator response monitor 314 determines if a difference between the second measured position and the second estimated position is within a second position threshold (block 538). If the difference is within the second position threshold at block 538, the method 412 returns to block 402 of FIG. 4 and the command input modifier 304 operates the second actuator 206 based on the command input. Additionally, the command input modifier 304 operates the second actuator 206 to move the flight control surface 202 based on the command input without use of the first actuator 204.

If the difference between the second measured position and the second estimated position is not within the threshold at block 538, the second actuator response monitor 314 determines (e.g., calculates or obtains) a second measured velocity of the second actuator 206 (block 540) and a second estimated velocity of the second actuator 206 based on the command input (block 542). For example, the second actuator response monitor 314 may determine the second measured velocity by calculating time derivatives of the measured position values received from the position sensor 236 (e.g., a time derivative of the piston 232 moving between the initial position and the first position). Additionally, the second actuator response monitor 314 may determine the second estimated velocity by taking a time derivative of the estimated positional values from the model provided by the second actuator position estimator 312.

The second actuator response monitor 314 determines if the calculated difference is within a second velocity threshold (block 546). If the calculated difference is within the second velocity threshold at block 546, the method 412 returns to block 402 of FIG. 4 and the command input modifier 304 operates the second actuator 206 based on the command input. Additionally, the command input modifier 304 operates the second actuator 206 to move the flight control surface 202 without use of the first actuator 204.

If the second actuator response monitor 314 determines that the difference is not within the second velocity threshold at block 546, the command input modifier 304 reactivates the first actuator (block 548) and commands the first actuator 204 and the second actuator 206 based on the command input (block 550). Additionally, the command input modifier 304 deactivates force flight optimization and/or force flight verification (block 552). For example, the command input modifier 304 ignores force flight data or information from the force fight verifier 316. The method 412 then returns to block 402.

Figure 6:
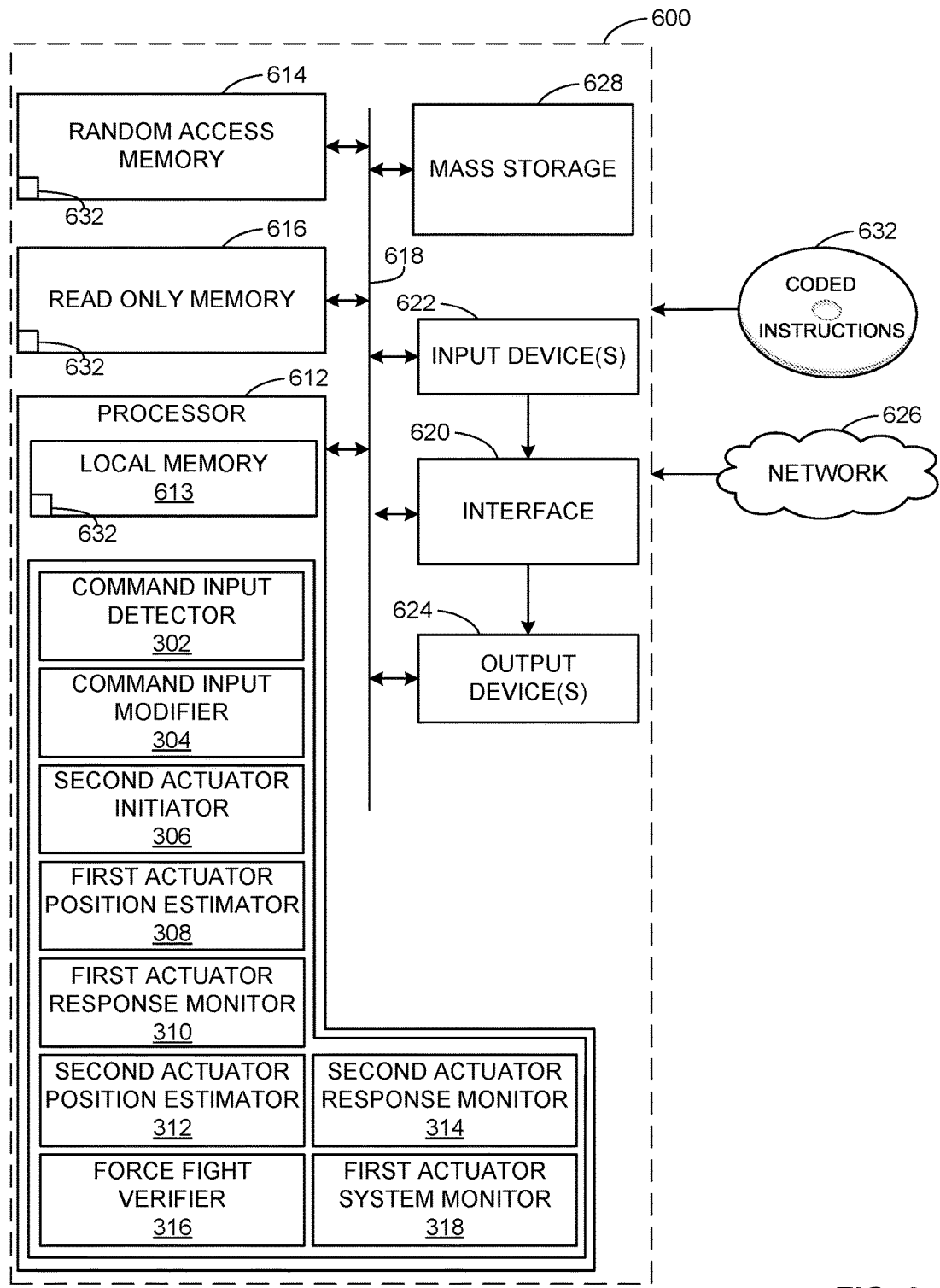
FIG. 6 is a block diagram of an example processor platform capable of executing the methods of FIGS. 4, 5A and 5B to implement the example flight control surface controller of the example actuation system of FIGS. 1-3.

FIG. 6 is a block diagram of an example processor platform 600 capable of executing instructions to implement the methods of FIGS. 4, 5A and 5B and the flight control surface controller 116 of FIGS. 1-3. The processor platform 600 can be, for example, a server, a personal computer, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The hardware processor may be a semiconductor based (e.g., silicon based) device. In this example, the processor implements the example command input detector 302, the example command input modifier 304, the example second actuator initiator 306, the example first actuator position estimator 308, the example first actuator response monitor 310, the example second actuator position estimator 312, the example second actuator response monitor 314, the example force fight verifier 316, the example first actuator system monitor 318, more generally, the flight control surface controller 116 of FIG. 3.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint a voice recognition system, joysticks, pedals, wheels and columns.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.), a field programmable gate array, a programmable logic device, and/or any other interface card The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Coded instructions 632 to implement the methods of FIGS. 4, 5A and 5B may be stored in the mass storage device 628, in the volatile memory 614, in the non-volatile memory 616, and/or on a removable tangible computer readable storage medium such as a CD or DVD.

At least some of the aforementioned examples include one or more features and/or benefits including, but not limited to, the following:

In some examples, an apparatus includes a hybrid power actuation system associated with a control surface of an aircraft. The hybrid power actuation system includes a first actuator or hydraulic actuator and a second actuator or an electric actuator. A flight control surface controller moves the control surface to a target position via the hybrid power actuation system based on a command input received by the flight control surface controller, the flight control surface controller to: obtain a flight characteristic of the aircraft; compare the flight characteristic to a flight characteristic threshold; in response to a first comparison result, cause the hydraulic actuator to move the control surface to the target position based on the command input without moving the electronic actuator; and in response to a second comparison result, cause the hydraulic actuator and the electric actuator to move the control surface to the target position based on the command input.

In some examples, a method includes receiving, by executing an instruction with at least one processor, a command input to move a control surface of an aircraft between an initial position and a target position via a hybrid power actuation system, the hybrid power actuation system having at least one of a hydraulic actuator or an electric actuator associated with the control surface; obtaining, by executing an instruction with at least one processor, a flight characteristic of the aircraft; and comparing, by executing an instruction with at least one processor, the flight characteristic to a flight characteristic threshold; in response to a first comparison result, commanding the hydraulic actuator to move the control surface to the target position based on the command input; and in response to a second comparison result, commanding the hydraulic actuator and the electric actuator to move the control surface to the target position based on the command input.

In some examples, a tangible computer-readable medium including instructions that, when executed, cause a machine to: receive a command input to move a control surface of an aircraft to a target position via a hybrid power actuation system, the hybrid power actuation system having at least one of a hydraulic actuator or an electric actuator associated with the control surface; obtain a flight characteristic of the aircraft; and compare the flight characteristic to a flight characteristic threshold; in response to a first comparison result, command the hydraulic actuator to move the control surface to the target position based on the command input; and in response to a second comparison result, command the hydraulic actuator and the electric actuator to move the control surface to the target position based on the command input.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a flight control surface controller to move a control surface of an aircraft to a target position via at least one of a first actuator or a second actuator associated with the control surface based on a command input received by the flight control surface controller, the flight control surface controller to:
obtain a flight characteristic of the aircraft;
compare the flight characteristic to a flight characteristic threshold;
in response to a first comparison result, cause the first actuator to move the control surface to the target position based on the command input without moving the second actuator; and
in response to a second comparison result, cause the first actuator and the second actuator to move the control surface to the target position based on the command input.

2. The apparatus of claim 1, further including a first actuator response monitor to detect a first measured position and a first determined velocity of the first actuator in response to the first comparison result, the first actuator response monitor to compare the first measured position to a first position threshold and the first determined velocity to a first velocity threshold.

3. The apparatus of claim 2, wherein in response to a comparison between first measured position and the first position threshold and a comparison between the first determined velocity and the first velocity threshold, the flight control surface controller is to at least one of:
operate the first actuator without activating the second actuator if at least one of the first measured position is within the first position threshold or the first determined velocity is within the first velocity threshold;
activate the second actuator based on the command input if the first measured position deviates from the first position threshold and the first determined velocity deviates from the first velocity threshold such that the first actuator and the second actuator move the control surface based on the command input; or
activate the second actuator and bypass the first actuator if the first actuator is in a fail condition.

4. The apparatus of claim 2, further including a first actuator position estimator to determine a first estimated position of the first actuator based on the command input, the first actuator response monitor to compare the first measured position and the first estimated position to determine if the first measured position is within the first position threshold.

5. The apparatus of claim 4, wherein to detect the first measured position of the first actuator, the first actuator response monitor is to receive a first position signal from a first position sensor coupled to the first actuator.

6. The apparatus of claim 4, wherein to detect the first determined velocity of the first actuator, the first actuator response monitor is to at least one of calculate a time derivative of a distance in which the first actuator moves from an initial position to the first measured position or receive a first measured speed from a rate sensor coupled to the first actuator.

7. A method comprising:
receiving, by executing an instruction with at least one processor, a command input to move a control surface of an aircraft between an initial position and a target position via at least one of a first actuator or a second actuator associated with the control surface;
obtaining, by executing an instruction with at least one processor, a flight characteristic of the aircraft; and
comparing, by executing an instruction with at least one processor, the flight characteristic to a flight characteristic threshold;
in response to a first comparison result, commanding the first actuator to move the control surface to the target position based on the command input; and
in response to a second comparison result, commanding the first actuator and the second actuator to move the control surface to the target position based on the command input.

8. The method of claim 7, wherein in response to the first comparison result and commanding the first actuator to move the control surface to the target position based on the command input, further including:
receiving, by executing an instruction with at least one processor, a first measured position and a first measured velocity of the first actuator as the first actuator moves from the initial position to a first position, the first position being between the initial position and a final position required to move the control surface to the target position;
determining, by executing an instruction with at least one processor, if the first measured position deviates from a first position threshold;
in response to a determination of the first measured position deviating from the first position threshold, determining, by executing an instruction with at least one processor, if the first measured velocity deviates from a first velocity threshold; and
in response to a determination that the first measured velocity deviates from the first velocity threshold, commanding, by executing an instruction with at least one processor, the first actuator and the second actuator to move based on the command input.

9. The method of claim 8, wherein determining if the first measured position deviates from the first position threshold includes:
determining, by executing an instruction with at least one processor, a time value associated with the first measured position;
using a model of estimated positional values versus time representative of the first actuator moving from the initial position to the target position based on at least the command input;
retrieving a first estimated position from the model corresponding with a time valve associated with the first measured position; and
comparing, to a first position threshold, a difference between the first measured position and the first estimated position.

10. The method of claim 9, wherein determining if the first measured velocity deviates from the first velocity threshold includes:
determining a measured time derivative between a measured initial position and the first measured position;
determining an estimated time derivative between an estimated initial position and the first estimated position obtained from the model; and comparing a difference between the measured time derivative and the estimated time derivative to the first velocity threshold.

11. The method of claim 7, wherein in response to the second comparison result, further including determining an operational condition of the first actuator and, in response to a determination indicative of the first actuator being in a non-failure condition, further including engaging a force fight and adjusting respective positions of at least one of the first actuator or the second actuator.

12. The method of claim 11, wherein in response to adjusting the respective positions of the at least one of the first actuator or the second actuator, further including analyzing, by executing an instruction with at least one processor, force fight data associated with the first actuator and the second actuator to determine if the force fight data is within a pre-determined threshold range.

13. The method of claim 12, further including deactivating the first actuator and operating the second actuator based on the command input in response to a determination of the force fight data being outside the pre-determined threshold range.

14. The method of claim 12, further including determining an operating condition of the first actuator and, in response to a determination of a fail condition of the first actuator, deactivating the first actuator and operating the second actuator based on the command input.

15. The method of claim 14, further including:
receiving, by executing an instruction with at least one processor, a second measured position and a second measured velocity of the second actuator as the second actuator moves based on the command input;
determining, by executing an instruction with at least one processor, if the second measured position deviates from a second position threshold; and
in response to a determination that the second measured position deviates from the second position threshold, determining, by executing an instruction with at least one processor, if the second measured velocity deviates from a second velocity threshold.

16. The method of claim 15, wherein in response to a determination that the second measured velocity deviates from the second velocity threshold, reactivating the first actuator and commanding the first actuator to move based on the command input without engaging fight force adjustment.

17. The method of claim 15, wherein determining if the second measured position deviates from the second position threshold includes:
determining, by executing an instruction with at least one processor, a time value associated with the second measured position;
using a model representing estimated positional values versus time of the second actuator based on the command input;
retrieving a second estimated position from the model corresponding with a time valve associated with the second measured position; and
comparing, to a second position threshold, a difference between the second measured position and the second estimated position retrieved from the model.

18. The method of claim 17, wherein determining if the second measured velocity deviates from the second velocity threshold includes:
determining a measured time derivative between a measured initial position and the second measured position;
determining an estimated time derivative between an estimated initial position and the second estimated position obtained from the model; and
comparing a difference between the measured time derivative and the estimated time derivative.

19. A tangible computer-readable medium comprising instructions that, when executed, cause a machine to:
receive a command input to move a control surface of an aircraft to a target position via at least one of a first actuator or a second actuator associated with the control surface;
obtain a flight characteristic of the aircraft; and
compare the flight characteristic to a flight characteristic threshold;
in response to a first comparison result, command the first actuator to move the control surface to the target position based on the command input; and
in response to a second comparison result, command the first actuator and the second actuator to move the control surface to the target position based on the command input.

20. The computer-readable medium as defined in claim 19 comprising instructions that, when executed, cause the machine to, in response to the first comparison result and commanding the first actuator to move the control surface to the target position based on the command input:
receive a first measured position and a first measured velocity of the first actuator as the first actuator moves from an initial position to a first position, the first position being between the initial position and a final position required to move the control surface to the target position;
determine if the first measured position deviates from a first position threshold;
in response to a determination of the first measured position deviating from the first position threshold, determine if the first measured velocity deviates from a first velocity threshold; and
in response to a determination that the first measured velocity deviates from the first velocity threshold, command the first actuator and the second actuator to move based on the command input.

* * * * *